May 26, 1931.  F. W. GREER  1,807,338
CONFECTION CONVEYING MACHINE
Filed March 28, 1931
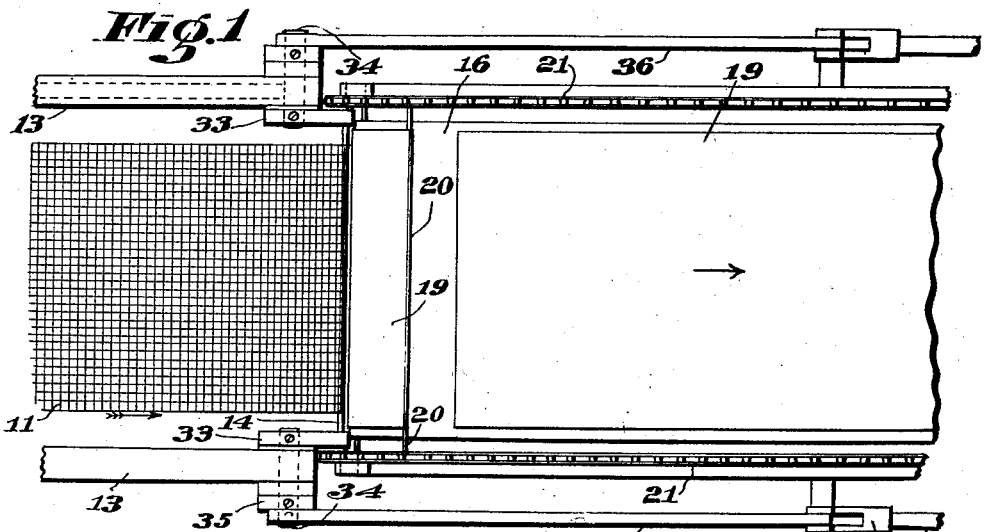
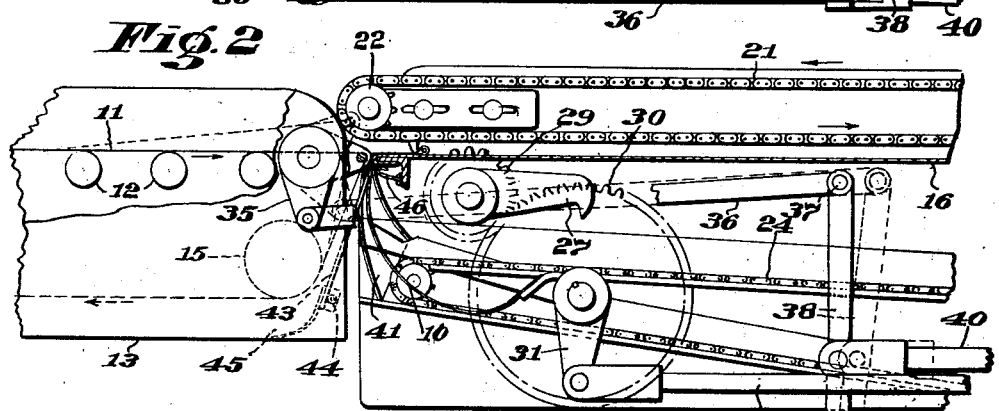
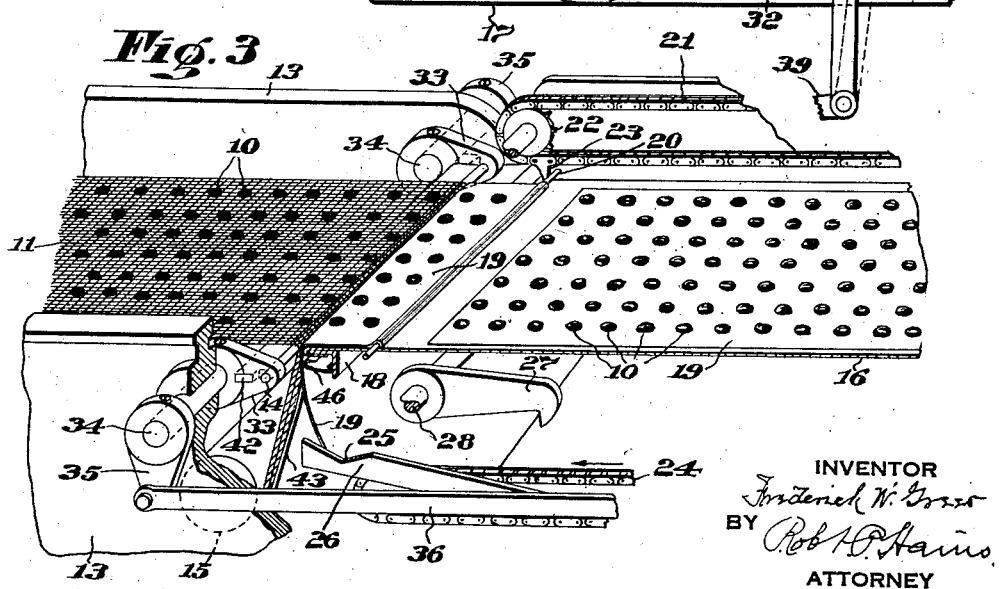
INVENTOR
Frederick W. Greer
BY
ATTORNEY Patented May 26, 1931

1,807,338

UNITED STATES PATENT OFFICE

FREDERICK W. GREER, OF CAMBRIDGE, MASSACHUSETTS

CONFECTION CONVEYING MACHINE

Application filed March 28, 1931. Serial No. 525,913.

This invention relates to confection conveying machines of the type provided with mechanism for depositing freshly coated confection upon flexible plaques.

In the J. W. Greer and F. W. Greer Patent No. 1,732,228, granted October 22, 1929, mechanism is shown, described and claimed for placing freshly coated confections upon plaques, which in turn are placed upon traveling trays, and after the confections upon the trays have set or cooled sufficiently the plaques are removed from the trays and the confections are removed from the plaques, whereupon the plaques are returned to the initial position for reuse.

In accordance with the disclosure of said patent each plaque is provided at its forward end with a plaque advancing bar, and mechanism is provided for carrying successive plaques upwardly around the edge of and along the upper face of a plaque supporting surface to the traveling trays. The confections are delivered to the plaques by an endless conveyor as the plaques pass upwardly between the conveyor and said surface and around the edge of the latter, and the discharge end of the conveyor is positioned close to said surface to facilitate the smooth transfer of the freshly coated confections from the conveyor to the plaques.

The space between the plaque supporting surface and the endless conveyor in the construction of said patent is not sufficient to clear the rod at the forward end of a plaque, and it is therefore necessary to provide means for momentarily increasing this space so that the rod may pass upwardly therethrough. This is accomplished in accordance with the disclosure of said patent by automatically shifting the plaque supporting surface away from the end of the conveyor each time a plaque rod is carried upwardly to the surface.

While the construction of the patent for momentarily increasing the space between the endless conveyor and plaque supporting surface works satisfactory for most purposes, it is found that in some cases the very slight shifting movement that is imparted to the plaque supporting surface is sufficient to form undesirable "bottoms" or "feet" on the coated confections.

The present invention therefore contemplates means for overcoming this undesirable feature of the construction of said patent, and is accomplished in accordance with the present invention by retaining the plaque supporting surface in a fixed position and by periodically shifting the delivery end portion of the conveyor relative to said surface to clear the plaque advancing rods.

It is important that the periodical shifting of the end portion of the conveyor be effected without disturbing the continuous travel of the conveyor, and this is accomplished in accordance with the present invention by shifting the roll at this end of the endless conveyor through a small arc adapted to maintain a substantially constant tension upon the conveyor apron.

The above and other features of the invention and novel combination of parts will be hereinafter described in connection with the accompanying drawings which illustrate one good practical form of the invention.

In the drawings:—

Fig. 1 is a top plan view of the portions of a confection conveying machine with which the features of the present invention are associated.

Fig. 2 is a side elevation with parts broken away of the mechanism of Fig. 1; and Fig. 3 is a perspective view with parts in section of the mechanism of Fig. 1.

Since the present invention relates to improvements over the construction disclosed in the Patent No. 1,732,228, above mentioned, for depositing freshly coated confections upon flexible plaques, the features of the present invention are shown as associated with a machine of the type disclosed in said patent.

Referring to the accompanying drawings, the freshly coated confections or other articles 10 are carried by an endless conveyor, such as the wire apron 11, of well known construction, and adapted to advance the coated confections from a source of supply, such as a chocolate coating machine, not shown, to the plaque advancing mechanism to be described. The upper run of the conveyor 11 is shown as supported by the rollers 12 extending transversely between the side walls 13 of the machine and at the discharge end of the upper run of the conveyor 11 is provided the small roll 14, which in the present case is not positively driven but is free to be rotated by the apron passing around this roll and downwardly about the relatively large driving roll 15.

In accordance with the present invention the small roll 14 is normally supported in close proximity to an end of the plaque supporting surface or table 16. This surface is secured in a fixed position between the side walls 17 of the plaque handling machine, and the plaque receiving end of the surface 16 is shown as supported by the transversely extending bar 18.

The flexible plaques 19 may be constructed as shown and described in the above mentioned patent and each consists of a sheet of fabric of any suitable material and preferably provided with a glazed surface so that the hot chocolate will not stick thereto, and the forward end of each plaque 19 is folded about or otherwise secured to a transversely extending bar 20 adapted to be engaged to advance the plaque along its path of travel.

In the construction shown the plaques are advanced in a right hand direction along the face of the surface 16 by the power driven chains 21 which pass downwardly around the supporting sprockets 22, as shown, and these chains are provided at spaced intervals with the lugs 23 adapted to engage the projecting ends of the rods 20 to pull the plaques lengthwise of the surface 16, the same as in the patent above mentioned.

The empty plaques are conveyed one after the other by the lower chains 24 in a left hand direction beneath the supporting surface 16 to a position in which the ends of a rod 20 of a plaque are delivered to the notches 25 of the plaque supporting bars 26, the same as in the construction of said patent.

Promptly after each plaque is conveyed to the position just mentioned with its bar 20 resting in the notches 25 the bar is engaged by the rocking arms 27, secured to the rocking shaft 28, the arrangement being such that the rocking movement of the arms 27 serves to carry the plaque supporting rod upwardly within the space between the delivery end of the conveyor 11 and the receiving end of the surface 16 and to hold the bar substantially flush with the upper face of the surface 16 until its ends are engaged by the chain operated lugs 23 to advance the plaque along the upper face of the surface 16 as above pointed out, whereupon the rocking arms are rotated in the reversed or contra-clockwise direction back to their inactive position in which they are shown in Figs. 2 and 3. The construction and operation of the rocking arms 27 may be the same as in said patent and the rocking movement is imparted to these arms by the cooperating gears 29 and 30, rocking movement being imparted to the latter by the arm 31, the outer end of which is pivotally secured to the operating link 32 which may be periodically shifted in the direction of its length by the means described in said patent.

It is desirable to make the gap between the discharge end of the conveyor apron 11 and the end of the plaque supporting table or surface 16 as small as practical so that the freshly coated confections 10 may be transferred smoothly from the conveyor 11 to a plaque without injuring the soft coating material. As a result the space just mentioned is not sufficient to permit the plaque advancing rod 20 to pass upwardly therethrough, so that it becomes necessary to momentarily increase this space while the rod is being carried upwardly therethrough by the rocking arms 27.

This is accomplished in accordance with the present invention by rotatably mounting the rod 14 in the end portions of the rocking brackets 33 which brackets are rigidly secured to the shafts 34 that are journaled for rocking movement in the side frames 13, and rocking movement is imparted to the shafts 34 by the downwardly extending arms 35, the lower end of each of these arms having pivotally secured thereto an operating link 36. The opposite ends of these links are pivotally secured at 37 to the upper ends of the actuating levers 38. These levers are pivoted at their lower ends to the fixed supporting brackets 39, and rocking movement is imparted to the levers 38 by the operating links 40 which may be periodically operated the same as the links 75 of the patent above cited.

The arrangement just described is such that the rocking brackets for supporting the roller 14 are normally supported in the position in which they are shown in full lines in Fig. 2 but are momentarily raised to the dotted line position of this figure to clear the rod 20 of a plaque as the rod is carried upwardly by the rocking arms 27 and is advanced along the upper face of the surface 16 a short distance, whereupon the rocking brackets 33 are returned to their normal lowered position to support the discharge end of the conveyor 11 in alignment with and in close proximity to the portion of the plaque passing around the end portion of the surface 16. In order to emphasize the rocking movement of the roll 14 the same is dotted in Fig. 2 as raised a substantial distance above the plane of the surface 16, but in practice a very slight upward movement of this roll will be sufficient to clear the rod 20 as it is moved upward onto the surface 16.

Guides 41 are preferably provided in position to guide the ends of a rod 20 as it is being carried upwardly between the endless conveyor and the end of the table 16. The roll 14 is shown as having the usual backing support 42 carried by the rocking brackets 33 to prevent undue bending of the roll 14 under the tension of the endless apron.

The rocking movement employed to shift the roll 14 and move a portion of the conveyor 11 upwardly from its normal position to the dotted line position of Fig. 2 is preferably such that it maintains a constant tension upon the conveyor apron so as not to affect the continuous travel of this apron about its supporting and driving rollers. The confections 10 are preferably placed upon the apron 11 in spaced groups having a gap provided between the groups as shown in Fig. 3, and the operation of the entire machine is such that a gap between the groups will occur at the discharge end of the apron 11 at the time the forward end of a plaque is being carried upwardly onto the upper face of the surface 16. As a result confections will not be delivered to the receiving end of the table 16 during the presentation of a new plaque to the supporting surface.

It is desirable to provide a guard plate 43 between the downwardly extending portion of the conveyor 11 and the plaque handling mechanism to prevent the plaque from accidently coming in contact with the conveyor. It is also desirable to maintain an appreciable amount of tension upon each plaque as it is drawn around the edge of the surface 16 to pull the plaque tightly around said edge. This is readily accomplished by pivotally supporting the guard plate 43 at 44 and by providing yielding means such as the spring 45 for urging the upper portion of the guard plate 43 towards the plaque guide 46 so as to frictionally engage the plaque therebetween and tension the same.

It will be seen from the foregoing that through the construction of the present invention whereby the delivery end portion of the conveyor 11 is momentarily moved away from the plaque supporting surface 16 to clear the plaque advancing bar 20, a smooth and highly satisfactory operation is secured and the freshly coated confections are transferred without injury from the endless conveyor 11 to the plaques being drawn upwardly around and along the upper face of the supporting surface 16.

What is claimed is:

1. In a machine of the class described, mechanism for loading flexible plaques, comprising in combination, a plaque supporting surface, means for carrying successive plaques upwardly around the edge of said surface and along the surface, a conveyor apron having the end of its upper run positioned close to the end of said surface to deliver articles upon a plaque passing upwardly therebetween, and mechanism for momentarily shifting the conveyor apron away from said surface to clear the forward end of a plaque passing upwardly therebetween.

2. In a confection handling machine, mechanism for loading flexible plaques, comprising in combination, a plaque supporting surface, means for carrying successive plaques having advancing bars at their forward end upwardly around the edge of said surface and along the surface, a conveyor apron having the end of its upper run positioned close to the end of said surface to deliver confections upon a plaque passing upwardly therebetween, and power means for momentarily shifting the conveyor apron away from said surface to clear the plaque advancing bar as it passes upwardly therebetween.

3. In a machine of the class described, mechanism for loading flexible plaques, comprising in combination, a plaque supporting surface, means for carrying successive plaques each having an advancing bar at its forward end upwardly around the edge of said surface and along the surface, a conveyor having its discharge end positioned close to the end of said surface to deliver articles upon the plaque passing upwardly therebetween, and mechanism for momentarily shifting the conveyor away from said surface to clear the plaque advancing bar as it passes upwardly therebetween.

4. In a machine of the class described, mechanism for loading flexible plaques, comprising in combination, a plaque supporting surface, means for carrying successive plaques upwardly around the edge of said surface and along the surface, an endless conveyor having the end of its upper run positioned close to the end of said surface to deliver articles upon the plaque passing upwardly therebetween, and rocking means for supporting the delivery end portion of the conveyor adjacent said surface and adapted to be momentarily rocked to move the delivery end of the conveyor away from said surface to clear the forward end of a plaque passing upwardly therebetween.

5. In a machine of the class described, mechanism for loading flexible plaques, comprising in combination, a plaque supporting surface, means for carrying successive plaques each having a bar at its forward end upwardly around the edge of said surface and along the surface, an endless conveyor having the end of its upper run positioned close to the end of said surface to deliver articles upon the plaque passing upwardly therebetween, and mechanism for momentarily raising the delivery end portion of the conveyor to clear the plaque advancing bar as it passes upwardly about the edge of said surface.

6. In a machine of the class described, mechanism for loading flexible plaques, comprising in combination, a plaque supporting surface, means for carrying successive plaques upwardly around the edge of said surface and along the surface, an endless conveyor having the end of its upper run positioned close to the end of said surface to deliver articles upon the plaque passing upwardly therebetween, and mechanism for momentarily shifting the portion of the conveyor adjacent said surface away from the surface sufficiently to clear the forward end of a plaque passing upwardly therebetween and adapted to maintain a substantially constant tension upon the endless conveyor as it is shifted.

7. In a machine of the class described, mechanism for loading flexible plaques, comprising in combination, a plaque supporting surface, means for carrying successive plaques upwardly around the edge of said surface and along the surface, an endless conveyor having the delivery end of its upper run positioned close to the end of said surface to deliver articles upon the plaque passing upwardly therebetween, means for momentarily shifting the conveyor away from said surface to clear the forward end of a plaque passing upwardly therebetween, and a movable guard plate supported adjacent a downwardly extending portion of the conveyor and adapted to engage a plaque passing upwardly around said surface to tension the plaque.

In testimony whereof, I have signed my name to this specification.

FREDERICK W. GREER.